Oct. 27, 1964  F. J. MULLA  3,154,458
TRIGGER PROOF SPLICING TAPE
Filed June 5, 1961
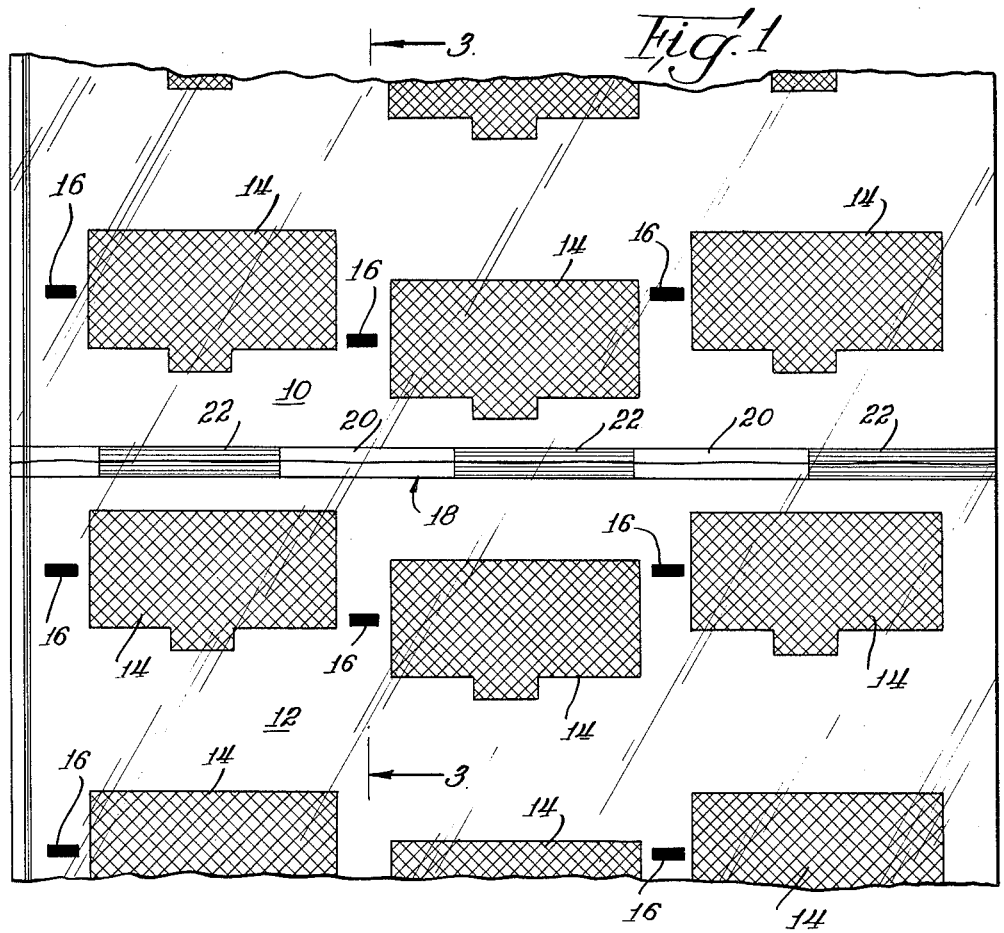
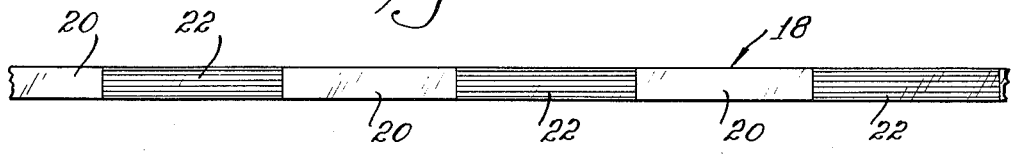
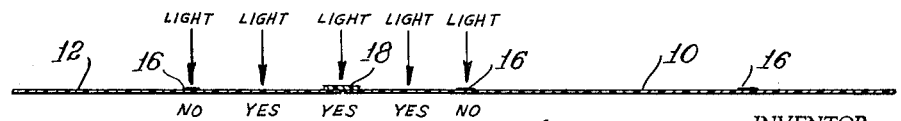
INVENTOR.
Frank J. Mulla

3,154,458
TRIGGER PROOF SPLICING TAPE
Frank J. Mulla, Seven Hills, Ohio, assignor to The Dow Chemical Company, Midland, Mich., a corporation of Delaware
Filed June 5, 1961, Ser. No. 114,878
1 Claim. (Cl. 161—36)

This invention relates to a pressure sensitive tape for splicing sheet material used in automatic packaging machinery.

Briefly, the invention relates to a pressure sensitive colored tape for joining strips of sheet material, i.e., thermoplastic film, used in forming a package. The package containing the splice may thus be readily identified and removed, thereby eliminating a leaker or defective package. In using a solid colored tape, the operation of one or more photoelectric units, used on a packaging machine for controlling the packaging process, may be interfered with. The tape of the present invention satisfies the need for providing tape splice identification, and at the same time avoids undesired interference with photoelectric sensing units. Briefly, the tape of the invention is formed with a plurality of alternately arranged transparent portions and opaque portions. The transparent portions are arranged for longitudinal alignment with the photoelectric units as the spliced sheet material is moved in the packaging machine. In such manner, operation of the photoelectric units is not interfered with by the tape.

A more specific object is to provide a pressure sensitive tape for use in automatic packaging machinery, which tape will indicate a sheet material splice so that a package containing the splice may be identified and removed.

These and further objects and features of the invention will become more apparent from the following description and accompanying drawing wherein:

FIG. 1 is a plan view of sheet material used in a packaging machine and illustrating a splice made with a tape embodying the principles of the invention;

FIG. 2 is a plan view of a portion of said tape; and

FIG. 3 is a section view generally as seen along line 3—3 in FIG. 1.

Referring now to the drawing, numerals 10 and 12 identify two sheets or films of transparent plastic-type material, as used in packaging machines, which have areas of printed material 14 thereon, as well as small rectangular opaque areas 16, all arranged at spaced intervals as shown. The areas 16 form photoelectric sensing unit actuating means, whereby certain operations on an automatic packaging machine (not shown) to which the film is being fed, are initiated for required film handling, as is known to those skilled in the art. The ends of the sheets 10 and 12, are spliced, or held together by a pressure sensitive tape 18, whereby the sheets may be fed into the packaging machine in continuous lengths.

The tape 18, which embodies the principles of the invention, is made from a pressure sensitive plastic material, and is arranged to have a plurality of light transmitting or transparent portions 20, and a plurality of opaque portions 22, which portions are preferably of a brilliant color, said portions 20 and 22 being arranged in alternate sequence. The tape 18 is positioned upon the sheets 10 and 12 so that the transparent portions 20 are in general longitudinal alignment with the opaque areas 16. The opaque portions 22 of the tape may be in general alignment with the areas of printed material 14, however, care should be taken to see that no part of any opaque portion 22 is in longitudinal alignment with any part of an opaque portion 16. Or in other words, the transparent portions 20 of the tape should be arranged upon the spliced sheets for passing through a light beam directed toward a photoelectric unit as the sheets are fed through the packaging machine.

In using the sheets which have been spliced with the tape 18, by use of heat or otherwise, it will be seen that the tape will not interfere with any photoelectric sensing unit as the sheets pass between a light source and a photoelectric unit. In such manner, the tape may be used to splice the sheets being fed to the packaging machine, and the colored portions 22 will identify a package formed with the spliced portion so that such packages may be removed, thus eliminating leaker or defective packages. It will be understood that the arrangement of the transparent portions and opaque portions on any given tape, will depend upon the width of the printed material 14 thereon, and the number of strips of packaging material forming any given film being run. For example, in the case of the films 10 and 12, the overall width of the films includes three strips of material from which packages will subsequently be formed after the film has been slit along the length thereof.

It will be seen from the foregoing that the tape 18 will satisfy the objectives of the invention in a simple and effective manner.

The foregoing description has been given in detail without thought of limitation since the inventive principles involved are capable of assuming other forms without departing from the spirit of the invention or the scope of the following claim.

What is claimed is:

Spliced sheet material for use in automatic packaging machinery having a photoelectric sensing unit, the splice of said sheet material having no effect upon said sensing units and consisting of the transverse ends of two pieces of sheet material in abutting relationship secured together by a plastic tape having a pressure sensitive adhesive coating and having a plurality of light transmitting portions and a plurality of opaque portions, which portions are arranged in repetitive alternate sequence and which are coextensive in width with the tape, and being arranged so that the transparent portions thereof are in longitudinal alignment with the opaque areas on said spliced sheet material.

References Cited in the file of this patent

UNITED STATES PATENTS

| | | |
|---|---|---|
| 1,953,072 | Casper | Apr. 3, 1934 |
| 2,086,554 | Hoorn | July 13, 1937 |
| 2,156,501 | Katz | May 2, 1939 |
| 2,320,338 | Bryce | June 1, 1943 |
| 2,600,817 | Victoreen | June 17, 1952 |
| 2,699,103 | Stasikewich | Jan. 11, 1955 |
| 2,731,200 | Koelsch | Jan. 17, 1956 |
| 2,742,631 | Raychmann et al. | Apr. 17, 1956 |
| 2,888,570 | Toulmin | May 26, 1959 |
| 2,940,884 | White | June 14, 1960 |
| 2,956,703 | Royal | Oct. 18, 1960 |
| 3,065,355 | Barnes | Nov. 20, 1962 |

FOREIGN PATENTS

| | | |
|---|---|---|
| 808,096 | Great Britain | Jan. 28, 1959 |